(12) United States Patent
de Jonge et al.

(10) Patent No.: US 10,994,519 B2
(45) Date of Patent: May 4, 2021

(54) FOAMED BLOW MOLDED ARTICLE

(71) Applicant: SABIC GLOBAL TECHNOLOGIES B.V., Bergen op Zoom (NL)

(72) Inventors: Harmen Maria Hendrik de Jonge, Sittard (NL); Niclasina Siberia Johanna Alberdina Gerrits, Sittard (NL); Martin Antonius van Es, Landgraaf (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 152 days.

(21) Appl. No.: 16/060,270

(22) PCT Filed: Jul. 22, 2016

(86) PCT No.: PCT/EP2016/067486
§ 371 (c)(1),
(2) Date: Jun. 7, 2018

(87) PCT Pub. No.: WO2017/097442
PCT Pub. Date: Jun. 15, 2017

(65) Prior Publication Data
US 2018/0354237 A1    Dec. 13, 2018

(30) Foreign Application Priority Data
Dec. 10, 2015 (EP) .................................. 15199271

(51) Int. Cl.
| | | |
|---|---|---|
| *B32B 27/06* | (2006.01) | |
| *B29B 13/08* | (2006.01) | |
| *B29C 49/00* | (2006.01) | |
| *B29C 49/04* | (2006.01) | |
| *B29C 49/22* | (2006.01) | |
| *B32B 27/32* | (2006.01) | |
| *B65D 65/40* | (2006.01) | |
| *B65D 1/02* | (2006.01) | |
| *B29K 23/00* | (2006.01) | |
| *B29K 105/04* | (2006.01) | |
| *B29L 31/00* | (2006.01) | |

(52) U.S. Cl.
CPC ............ *B32B 27/065* (2013.01); *B29B 13/08* (2013.01); *B29C 49/0005* (2013.01); *B29C 49/04* (2013.01); *B29C 49/22* (2013.01); *B32B 27/32* (2013.01); *B65D 1/0215* (2013.01); *B65D 65/40* (2013.01); *B29K 2023/065* (2013.01); *B29K 2105/04* (2013.01); *B29L 2031/7158* (2013.01); *B32B 2266/025* (2013.01); *B32B 2323/043* (2013.01); *B32B 2439/60* (2013.01)

(58) Field of Classification Search
CPC ..... B29C 49/0005; B29C 49/04; B29C 49/22; B29B 13/08; B29K 2023/065; B29K 2105/04; B32B 27/065; B32B 27/32; B32B 2266/025; B32B 2323/043; B32B 2439/60; B65D 1/0215; B65D 65/40; B29L 2031/7158

See application file for complete search history.

(56) References Cited

U.S. PATENT DOCUMENTS

| | | |
|---|---|---|
| 3,436,446 A | 4/1969 | Angell, Jr. |
| 5,508,319 A | 4/1996 | Denicola, Jr. et al. |
| 5,552,104 A | 9/1996 | Denicola, Jr. et al. |
| 5,916,926 A | 6/1999 | Cooper et al. |
| 6,169,122 B1 | 1/2001 | Blizard et al. |
| 6,221,925 B1 | 4/2001 | Constant et al. |
| 6,376,059 B1 | 4/2002 | Anderson et al. |
| 2003/0021927 A1 | 1/2003 | Boenig |
| 2016/0101555 A1 | 4/2016 | Knipp |
| 2018/0127572 A1* | 5/2018 | Gerrits ..................... C08J 9/122 |
| 2019/0023866 A1 | 1/2019 | Gerrits et al. |

FOREIGN PATENT DOCUMENTS

| | | |
|---|---|---|
| EP | 1642926 A1 | 4/2006 |
| EP | 2246175 A1 | 11/2010 |
| JP | 201483770 A | 5/2014 |
| WO | 9824836 A1 | 6/1998 |
| WO | 0064967 A1 | 11/2000 |
| WO | 2015006772 A1 | 1/2015 |

OTHER PUBLICATIONS

International Search Report for International Application No. PCT/EP2016/067486; International Filing Date: Jul. 22, 2016; dated Sep. 21, 2016; 5 Pages.
Machine Translation of JP2014083770; Date of Publication: May 12, 2014; 22 Pages.
Ruinaard "How to Choose a Polyolefin Grade for Physical Foaming" RAPRA Conference Presentation—Blowing Agents and Foaming Processes (2005); 32 Pages.
Written Opinion of the International Searching Authority for International Application No. PCT/EP2016/067486; International Filing Date: Jul. 22, 2016; dated Sep. 21, 2016; 5 Pages.
"Melt Elasticity/Strength" by Gottfert. Available at https://www.goettfert.com/application-knowledge/applications/for-capillary-rheometer/melt-elasticitystrength.html. Accessed Sep. 10, 2019 (Year: 2019).
Weber et al., "Foamed Plastics" Ullmann's Encyclopedia, 2002, Wiley VCH Verlag, 54 Pages.

* cited by examiner

*Primary Examiner* — Yan Lan
(74) *Attorney, Agent, or Firm* — Cantor Colburn LLP

(57) ABSTRACT

The invention is directed to a blow molded article. The article comprises at least three layers wherein layer A comprises polymer, layer B comprises a foam composition comprising high density polyethylene having a quotient of melt strength and apparent viscosity>2 cN/k.Pa.s and layer C comprises polymer wherein the layer comprising the foam composition is enclosed between two layers A and C and wherein the melt strength is determined as described in ISO 16790:2005 and the apparent viscosity is determined as described in ISO 11443:2014 and wherein the foam composition is produced with a physically blowing agent.

16 Claims, No Drawings

FOAMED BLOW MOLDED ARTICLE

CROSS REFERENCE TO RELATED APPLICATIONS

This application is a 371 of International Application No. PCT/EP2016/067486, filed Jul. 22, 2016, which claims priority to European Application Serial No. 15199271.6 filed Dec. 10, 2015 which are incorporated herein by reference in their entirety.

The invention relates to foamed blow molded articles comprising polyethylene foam.

The production of foamed blow molded articles may take place via an extrusion blow moulding process (EBM) wherein plastic is melted and extruded into a hollow tube (a parison). This parison is then captured by closing it into a cooled metal mold. Air is then blown into the parison, inflating it into the shape of the hollow bottle, container, or part. After the plastic has cooled sufficiently, the mold is opened and the part is ejected.

Polyethylene foams are described in Ullmann's Encyclopedia "Foamed Plastics" by Heinz Weber et al, (2002; Wiley VCH Verlag). These foams are classified as low density and high density foams. These foams may be non-crosslinked or crosslinked foams. Most polyolefin foams and most polyethylene foams are made from low density polyethylene (LDPE). Polyolefin foam may be produced via a chemical blowing process or via a physically blowing process. An important polyolefin foam is physically blown polyethylene foam which is commonly produced with blowing agents for example nitrogen, carbon dioxide, isobutane, pentane and cyclopentane.

Rigid packaging growth remains strong, with the demand fueled by the popularity of single serve packages such as for example bottles. The rigid packaging industry as a whole is facing several key challenges such as for example rising energy and transport costs leading to additional margin pressures, stringent recycling targets putting pressure on packaging suppliers, and growing public pressure to reduce excessive packaging as consumers become more aware of how packaging has an impact on the environment.

The object of the present invention is to produce a plastic bottle with reduced weight. The bottle must also show the desired values for mechanical properties such as for example flexural rigidity.

The blow molded article according to the invention is characterised in that the article comprises at least three layers wherein
  layer A comprises polymer,
  layer B comprises a foam composition comprising high density polyethylene having a quotient of melt strength and apparent viscosity >2 cN/k.Pa.s and
  layer C comprises polymer
wherein the layer B comprising the foam composition is enclosed between the two layers A and C, wherein the melt strength is determined as described in ISO 16790:2005 and the apparent viscosity is determined as described in ISO 11443:2014 and wherein the foam composition is produced with a physical blowing agent.

The melt strength is determined as described in ISO 16790:2005 using a capillary rheometer with a drawing device that pulls the molten polymer from the capillary die at a constant flow rate and at increasing drawing velocity. The capillary rheometer is operated at a temperature of 190° C. The preheating time is 300 seconds. The piston speed is 0.049 mm/s and the barrel diameter is 12 mm. The capillary has a length of 40 mm and a diameter of 2 mm and an entrance angle of 180° (flat). As a consequence the throughput is 5.5 mm$^3$/s and the apparent shear rate is 7s$^{-1}$. The take-off wheels operate at an initial speed of 1.8 mm/s and an acceleration of 1.2 mm/s$^2$. The melt strength is the maximum value of the drawing force which is usually realized at break of the extrudate.

The apparent viscosity is determined as described in ISO 11443:2014 using the same capillary rheometer and the same test conditions as described above for the determination of the melt strength. The apparent viscosity [Pa.s] is defined as the quotient of the apparent shear stress and the apparent shear rate.

Preferably the density of the high density polyethylene (HDPE) foam layer B ranges between ≥100 and ≤600 kg/m$^3$.

Suitable examples of blow molded multi-layer articles include bottles, containers, fuel tanks and air ducts.

Most preferable the multi-layer article is a bottle.

According to a preferred embodiment of the invention the bottle comprises at least three layers wherein
  layer A comprises polymer,
  layer B comprises a foam composition comprising high density polyethylene having a quotient of melt strength and apparent viscosity >2 cN/k.Pa.s.
  layer C comprises polymer
wherein the layer comprising the foam composition is enclosed between two layers A and C and wherein the melt strength is determined as described in ISO 16790:2005 and the apparent viscosity is determined as described in ISO 11443:2014 and wherein the foam composition is produced with a physically blowing agent.

The multilayer system may be composed of 3 or more layers. The amount of layers depends on the desired application of the system. At least one layer comprises a foam composition.

In case of a multilayer system comprising more than 3 layers, there will be other layers between layer A and foam layer B and between foam layer B and layer C. In the total multilayer system layer B is between Layer A and layer C.

The multi-layer article comprising the foam layer according to the invention results in a weight reduction of more than 20%, while the flexural rigidity remains on the same level or is improved relative to a multi-layer system comprising no foam layer. Other additional advantages include for example improved thermal insulation properties and excellent recyclability.

Generally the HDPE to be foamed has a value for the quotient of melt strength and apparent viscosity ≤30 cN/k.Pa.s.

Preferably the melt strength is ≥10 cN.

According to another preferred embodiment of the invention the HDPE to be foamed has a value for the quotient of melt strength and apparent viscosity >3 cN/k.Pa.s and more preferably >5 cN/k.Pa.s.

The melt index of the HDPE to be foamed ranges between ≥0.01 and ≤0.9 (measured according ISO1133-1:2011 at a temperature of 190° C. and at a load of 2.16 kg).

It is an advantage of the present invention that it is possible to produce bottles with HDPE foam produced with a physically blowing agent. The physically-blown HDPE foam is essentially free of residual chemical blowing agent and reaction-by-products of chemical blowing agent as well as of the polyolefin compound originating from the master batch of the chemical blowing agent. The raw material costs for physical foaming are lower than the costs for chemical foaming.

It is another advantage of the present invention that the top load properties of the bottle are improved. The bottles can be stacked in storage without causing the bottle to collapse.

According to a preferred embodiment of the invention the HDPE foam composition has been obtained by physical foaming HDPE with characteristics
MI in the range between 0.01 ands 0.9
density in the range between ≥930 and ≤985 kg/m³ and
a gel fraction less than 5%
which has been obtained by chain branching HDPE with characteristics
MI in the range between ≥7 and ≤100 and
density in the range between ≥930 and ≤985 kg/m³
It is an advantage that HDPE with increased melt strength is obtained by branching HDPE.

According to a further preferred embodiment of the invention the HDPE foam composition has been obtained by physical foaming HDPE with characteristics
MI in the range between ≥0.1 and ≤0.9
density in the range between ≥935 ands ≤970 kg/m³
a gel fraction less than 5% which has been obtained by chain branching HDPE with characteristics
MI in the range between ≥10 and ≤100 and
density in the range between ≥935 and ≤970 kg/m³.

According to another preferred embodiment of the invention the HDPE foam composition has been obtained by physical foaming HDPE with characteristics
MI in the range between ≥0.1 and ≤0.9
density in the range between ≥940 and ≤970 kg/m³ and
a gel fraction less than 3%
which has been obtained by chain branching HDPE with characteristics
MI in the range between ≥12 and ≤50 and
density in the range between ≥940 and ≤970 kg/m³

According to another preferred embodiment of the invention the HDPE foam composition has been obtained by physical foaming HDPE with characteristics
MI in the range between ≥0.1 and ≤0.9
density in the range between ≥945 and ≤965 kg/m³ and
a gel fraction less than 2%
which has been obtained by chain branching HDPE with characteristics
MI in the range between ≥12 and ≤30 and
density in the range between ≥945 and ≤965 kg/m³

Modifying by chain branching may be performed by irradiation, peroxide treatment, silane crosslinking or chain branching performed by catalysis during polymerisation in the reactor.

Preferably the chain branching is performed by irradiation.

Preferably irradiation takes place via electron beam irradiation, X-ray irradiation or gamma irradiation more preferably by electron beam irradiation.

EB irradiation is discussed in for example U.S. Pat. Nos. 5,508,319A, 5,552,104A, and by Keizo Makuuchi and Song Cheng, in Irradiation Processing of Polymer Materials and Its Industrial Applications, (ISBN 978-0-470-58769-0, John Wiley & Sons, 2012).

Suitable HDPE can be produced by chromium/silica catalysts, Ziegler-Matta catalysts or metallocene catalysts.

The polymer in layer A and layer C may be selected for example from a polyolefin. Preferably the polyolefin is polyethylene (PE) for example HDPE, LLDPE or LDPE or a combination of these materials. More preferably the selected polymer in layer A and in layer C is HDPE.

The outer layer A may be typically important for the visual aspects of the end application and the inner layer C may be of importance for the contact with for example food and has to meet the food approval requirements. The composition of layer A and layer C may be the same or different.

According to a preferred embodiment of the invention the multi-layer article comprises at least three layers wherein
layer A comprises HDPE
layer B comprises a foam composition comprising HDPE having a quotient of melt strength and apparent viscosity >2 cN/k.Pa.s
layer C comprises HDPE.

Each layer may comprise additives to obtain specific requirements,

Polymers like ethylene vinyl alcohol copolymers (EVOH) may be applied as polymer layer between layer A and foam layer B or foam layer B and layer C.

According to a further preferred embodiment of the invention the article according to the invention contains three layers.

The ratio between the thickness of the foam layer (B) and the total thickness is between 0.2-0.95. Preferably the ratio between the thickness of the foam layer (B) and the total thickness is between 0.4-0.9. More preferably the ratio between the thickness of the foam layer (B) and the total thickness is between 0.6-0.8.

The selected thickness ratio is dependent of both the desired application and the density of the foam layer B.

The density of the HDPE foam ranges between ≥100 and ≤600 kg/m³. The density of the foam is determined by the immersion method, also referred to as Archimedes method (ISO 1183-1).

Preferably the density of the resulting HDPE foam is ≤500 kg/m³. The density depends amongst others of the selection and amount of the blowing agent.

According to a preferred embodiment of the invention the foam has more than 90% closed cells.

The HDPE foam is produced via a physically blowing process of the HDPE.

The HDPE foam can be produced for example through extrusion technology. In this process the blowing gas is injected directly into the PE melt under pressure and homogeneously dissolved and mixed in the molten polyethylene. A minimum pressure, which depends on the gas used and the prevailing melt temperature, is needed to keep the gas dissolved in the PE melt. This pressure needs to be maintained through to the extruder in order to prevent the gas from expanding prematurely from the melt. On exiting from the die, the melt pressure decreases to the atmospheric pressure and the dissolved gas expands immediately from the melt to form the foam.

The extrusion HDPE foam has a closed cell structure, a narrow cell size distribution, a low foam density and good flexural rigidity.

The density of the foamed layer B is reduced by a factor of 2 to 3 and the flexural rigidity of the multilayer system is increased by more than a factor 2 preferably even more than a factor 6.

A weight reduction of ≥20% results in a high sustainability score, because less polymer is used for a specific application and less polymer is wasted.

Requirements for physical foaming of polyolefin compositions are disclosed in "How to choose a polyolefin grade for physical foaming" by Henle Ruinaart (Blowing agents and foaming processes 2005; Stuttgart Germany 10-11 May 2005).

The foaming conditions in the physical foaming process depend in part on the applied polymer. Generally, the temperature is close to the crystallisation temperature of the polymer.

The HDPE foam composition may comprise cell stabilizers selected from for example glycerol monostearate (GMS), glycerol monopaimitate (GMP), glycol di-stearate (GDS), palmitides and/or amides for example stearyl stearamide, palmitamide and/or stearamide.

The HDPE foam composition may comprise a nucleating agent. Suitable nucleating agents include for example an amide, an amine, an ester of an aliphatic ($C_{10}$-$C_{34}$) carboxylic acid, talcum, micro talcum and a mixture of sodium bicarbonate and citric acid. The acid may be a saturated or unsaturated acid.

The foaming process of HDPE takes place at temperatures between 120° C. and 140° C.

Suitable physical blowing agents include for example isobutane, $CO_2$, pentane, butane, nitrogen, isobutane with $CO_2$, nitrogen or pure $CO_2$ and/or a fluorohydrocarbon.

The HDPE foam composition may additionally contain other additives such as for example foam nucleating agents, flame retardants, pigments, lubricants, flow promoters, antistatic agents, processing stabilizers, long term stabilisers and/or UV stabilizers. The additives may be present in any desired amount to be determined by the man skilled in the art. These additives may be added pure or as a masterbatch before mixing this masterbatch with the polymer to be foamed.

The multilayer composition is blow molded at a temperature just above the crystallization temperature of the polyolefin resin. The temperature at which the viscosity increase begins due to the crystallization of polyethylene corresponds with the crystallization onset temperature from a DSC curve. In order to achieve on the one hand the maximum viscosity and hence the desired fine cellular structure and, on the other, to prevent the melt from "freezing" (crystallizing too rapidly) in the outlet, the melt temperature is maintained at about 22° C. and preferably about 16° C. above the crystallization onset temperature. The cell diameter can be determined with a Scanning Electron Microscope (SEM) in combination with imaging.

EP2246175 discloses a polyethylene resin foamed blow molded article obtained by extruding a foamable resin melt containing a physical blowing agent through a die to form a foamed parison, subsequently inserting the foamed parison in a mold and blow molding the foamed parison. The foamed blow molded article having a foam layer has an apparent density between 0.1 kg/m³ and 0.7 kg/m³, The resin composing the foam layer of the foamed blow molded article is a polyethylene having a density of at least 935 kg/m³, a melt tension or melt: strength between 0.7 cN and 9.1 cN at 190 degrees Celsius and a melt flow rate (MFR) or melt index of 1 g/10 min or more as measured at degrees Celsius under a load of 2.16 kg. EP2246175 discloses a process wherein the blowing nozzle is positioned opposite the die which facilitates homogeneous cooling of the parison. The technology according to EP2246175 cannot be used to produce bottles. The foam obtained with the process according to EP2246175 has maximum 85% closed cells.

WO2015/006772 discloses a formulation for an insulative cellular non-aromatic polymeric material comprising HDPE and a chemical blowing agent.

The invention will be elucidated by means of the following non-restrictive examples,

EXAMPLES

Electron beam irradiation of HDPE granules was carried out at using a 10 MeV Rhodotron. In order to improve the homogeneity of irradiation dose, HDPE was packed into bags of 600×450×100 mm³ containing 12.5 kg HDPE granules. The 100 mm thick bags were radiated with the target irradiation dose on two sides in order to further improve the homogeneity of the irradiation dose. The irradiated HDPE was characterized by the following measurements:

The melt strength was measured according ISO 16790:2005 using a Göttfert Rheograph 6000 in combination with a Rheotens 71.97. The equipment specifications are:
Oven diameter of 12 mm.
Capillary 40/2 (l/d), length 40 mm, diameter 2 mm, entrance angle 180° (flat).
Pressure transducer: max 200 bar.

The test conditions were as follows: the rheograph was filled in less than one minute and the sample preheating time was 300 seconds. The measuring temperature was 190° C. The speed of the piston was 0.049 mm/s corresponding to a throughput of 5.5 mm³/s and apparent shear-rate of $7s^{-1}$. The drawing device (Rheotens 71.97) was operated at an acceleration of 1.2 mm/s² and a velocity of 1.8 mm/s. The melt strength is expressed in cN.

The apparent viscosity was measured according ISO11443:2014 using the Göttfert Rheograph 6000 and the test: conditions being described for the determination of the melt strength. The apparent viscosity is defined as the quotient of the apparent shear stress and the apparent shear rate being $7\ s^{-1}$. The apparent shear stress is calculated from pressure drop [kPa] times the capillary diameter in mm divided by 4 times the length of the capillary in mm. The apparent shear rate (1/s) is calculated from the throughput (mm/s) divided by 6.28 times the Diameter (mm) to the power of 3. The apparent viscosity is usually expressed in kPa.s.

The melt index was measured according ISO1133-1:2011 at a temperature of 190° C. and at 2.16 kg.

The density of the compression molded HDPE disks was measured at a temperature of 23° C. according to ISO1183-1:2012 after at least one day of conditioning.

The gel content of irradiated polyethylene was determined according to ASTM D2765-11. The samples were extracted for 12 hours in o-xylene with 1% anti-oxidant. The xylene insoluble fraction was determined gravimetrically.

SABIC HDPE type CC2056 with a melt index of 19.6 (190 C, 2.16 kg) is used as a raw material. Table 1 and Table 2 show characteristics of electron beam irradiated HDPE (HDPE I) as compared to the values for unmodified HDPE (HDPE A)

TABLE 1

Characteristics of electron beam irradiated HDPE

| HDPE resin | Irradiation dose kGy | Melt index 90° C., 2.16 kg) | Density kg/m³ | Gel fraction % |
|---|---|---|---|---|
| HDPE I | 30 | 0.6 | 953 | 1.2 |
| HDPE A | 0 | 20 | 956 | n.a. |

TABLE 2

Melt strength and apparent viscosity of electron beam irradiated HDPE

| HDPE resin | Irradiation dosis kGy | Melt strength cN | Apparent viscosity kPa · s | Ratio between melt strength and apparent viscosity cN/kPa · s |
|---|---|---|---|---|
| HDPE I | 30 | 21.7 | 3.3 | 6.6 |
| HDPE A | 0 | 0.3 | 0.4 | 0.7 |

Foam blow molding of modified and unmodified HDPE was carried out on a blow molding machine with three extruders in combination with a three-layer extrusion head and a dynamic mixer with gas dosing between the extruder and the extrusion head. The main extruder for the middle layer was a 60/25 D extruder and the extruders for the outer layers where a 30/25 D and a 25/25 D extruder. Multi-layer bottles have been produced with a volume of 100-200 ml. Talc was added as a nucleating agent. Nitrogen is used as physical blowing agent. Table 3 and Table 4 provide information with respect to additives and machine settings.

TABLE 3

Nucleating agent and blowing agent.

| Commercial name | Chemical name | Master batch | |
|---|---|---|---|
| Schulman PBHFPE50T | Talc | 50% in LDPE | Nucleating agent |
| $N_2$ | Nitrogen | — | Blowing agent |

TABLE 4

Machine settings for blow molding foaming.

| | Parameter | Unit | Example I | Example II | Comparative Example A |
|---|---|---|---|---|---|
| Layer A | HDPE | Type | HDPE I | HDPE I | HDPE A |
| Layer B | HDPE | type | HDPE I | HDPE I | HDPE A |
| | Talc (masterbatch) | weight % | 4 | 8 | 8 |
| | Nitrogen | weight % | 0.23 | 0.34 | 0.23 |
| Layer C | HDPE | Type | HDPE I | HDPE I | HDPE A |
| Extruder | Throughput | kg/h | 7.2 | 7.2 | 3.6 |
| | Temperature | °C. | 225 | 225 | 225 |
| Die | Entrance Temperature | °C. | 135 | 135 | 140 |
| | Exit Temperature | °C. | 120 | 120 | 145 |
| Mold | Temperature | °C | Ambient | Ambient | Ambient |
| | Cycle time | s | 12 | 12 | 12 |

The total density of the foam blow molded samples was determined by the immersion method, also referred to as Archimedes method. The density is expressed in kg/m$^3$. The density of the foamed core was calculated using the following equation:

$$\text{density of foam core} = \frac{\text{total density} - (\text{fraction skin} \times \text{density skin})}{1 - \text{fraction skin}}$$

Total density is density of the three layer foam blow molded bottle (skins+core), The density of skin is assumed to be similar to the density of compact HDPE being 950 kg/m$^3$.

The open cell content was determined using a gas pycnometer. Samples of the foam blow molded bottles were taken being 5-10 gram in weight. The volume changes were measured at different nitrogen pressures. The open cell content was determined by extrapolation to atmospheric pressure, The cellular morphology of the HDPE foams was visualized using scanning electron microscopy. Each sample was frozen with liquid nitrogen and fractured. The fractured surface was made conductive by sputtering deposition of gold and observed using a Jeol JSM-820 operating at 20 kV. The microstructure of the materials has been studied in one plane (machine direction, thickness direction). Three micrographs were taken with a magnification of ×30. The cell size was calculated using an image processing tool based on the software Image J. The fraction skin is defined as the quotient of the thickness of the two skins and the total thickness.

The flexural properties of the foam blow molded samples were determined using ISO 178:2010 as a guideline. Five tests per sample were conducted, A sample width of 10 mm and a length of 80 mm was used, Following testing conditions were applied:

| Support distance | 50.65 mm |
|---|---|
| Testing speed | 2 mm/min |
| Modulus | between 0.05 and 0.25% strain |
| Temperature | 23° C. |

The flexural rigidity (F) is defined as the product of the modulus (E) by the moment of inertia (I). The moment of inertia (I=width×thickness$^3$/12) is influenced by the construction of the specific test specimen, whereas the modulus is a material property. In order to compare samples correctly, the thickness used to determine the moment of inertia (I) is corrected for the weight of the bottle assuming a linear relationship between the weight of the bottle and its thickness. The flexural rigidity (F) is calculated using the following formula:

$$\text{Flexural rigidity}\ (E.I) = \text{flexural modulus}\ (E) \times \frac{\text{width} \times \text{thickness}^3}{12}$$

TABLE 5

Structural and mechanical properties of three layer foam blow molded bottles with a weight of 13 gram as well as a compact bottle with the same weight

| Parameter | Unit | Example I | Example II | Comparative Example A | Compact bottle |
|---|---|---|---|---|---|
| Total density | kg/m$^3$ | 513 | 491 | 779 | 950 |
| Density foam layer | kg/m$^3$ | 421 | 432 | 714 | n.a. |
| Open cell content | % | 3 | 4 | 64 | n.a. |
| Cell size | μm | 115 | 88 | 69 | n.a. |
| Foam thickness/Total thickness | | 0.83 | 0.88 | 0.72 | n.a. |
| Thickness | μm | 0.89 | 1.09 | 0.59 | 0.47 |
| Flexural modulus | N/mm$^2$ | 554 | 376 | 773 | 1023 |
| Flexural rigidity (E.I) | N·mm$^2$ | 327 | 406 | 133 | 89 |

The invention claimed is:

1. A blow molded article characterised in that the article comprises at least three layers wherein
 layer A comprises polymer,
 layer B comprises a foam composition comprising high density polyethylene having a quotient of melt strength and apparent viscosity >3 cN/k.Pa.s and ≤30 cN/k.Pa.s,
 layer C comprises polymer,
 wherein the layer comprising the foam composition is enclosed between two layers A and C and wherein the melt strength is determined as described in ISO 16790: 2005 and the apparent viscosity is determined as described in ISO 11443:2014 and wherein the foam composition is produced with a physically blowing agent; and wherein the melt strength of the high density polyethylene is ≥10 cN; and wherein the foam composition comprising high density polyethylene has been obtained by physical foaming high density polyethylene with characteristics
MI in the range between ≥0.01 and ≤0.9,
density in the range between ≥930 and ≤985 kg/m³,
a gel fraction less than 5%,
which has been obtained by chain branching high density polyethylene with characteristics
MI in the range between ≥7 and ≤100, and
density in the range between ≥930 and ≤985 kg/m³,
wherein chain branching is performed by irradiation.

2. Article according to claim 1 characterised in that the density of the high density polyethylene foam layer B ranges between ≥100 and ≤600 kg/m³.

3. Article according to claim 1 characterised in that the high density polyethylene foam composition has been obtained by physical foaming high density polyethylene with characteristics
MI in the range between ≥0.1 and ≤0.9,
density in the range between ≥935 and ≤970 kg/m³,
a gel fraction less than 5%,
which has been obtained by chain branching high density polyethylene with characteristics
MI in the range between ≥10 and ≤100, and
density in the range between ≥935 and ≤970 kg/m³.

4. Article according to claim 3 characterised in that the high density polyethylene foam composition has been obtained by physical foaming high density polyethylene with characteristics
MI in the range between ≥0.1 and ≤0.9,
density in the range between ≥940 and ≤970 kg/m³,
a gel fraction less than 3%,
which has been obtained by chain branching high density polyethylene with characteristics
MI in the range between ≥12 and ≤50, and
density in the range between ≥940 and ≤970 kg/m³.

5. Article according to claim 1 characterised in that the foam has more than 90% closed cells.

6. Article according to claim 1 characterised in that the polymer in layer A and the polymer in layer C is polyolefin.

7. Article according to claim 6 characterised in that the polyolefin is high density polyethylene.

8. Article according to claim 1 characterised in that the article contains three layers.

9. Article according to claim 8 characterised in that the blow molded article is a bottle, container, air duct or fuel tank.

10. The article of claim 1, wherein the foam composition is essentially free of residual chemical blowing agents.

11. The article of claim 10, wherein the foam composition is essentially free of reaction-by-products of chemical blowing agents.

12. The article of claim 1, wherein the foam composition is free of residual chemical blowing agents and reaction-by-products of chemical blowing agents.

13. The article of claim 1, wherein the foam composition comprises high density polyethylene having a quotient of melt strength and apparent viscosity >5 cN/k.Pa.s and ≤30 cN/k.Pa.s.

14. Bottle comprising at least three layers wherein
layer A comprises polymer,
layer B comprises a foam composition comprising high density polyethylene having a quotient of melt strength and apparent viscosity >3 cN/k.Pa.s and ≤30 cN/k.Pa.s,
layer C comprises polymer,
wherein the layer comprising the foam composition is enclosed between two layers A and C and wherein the melt strength is determined as described in ISO 16790:2005 and the apparent viscosity is determined as described in ISO 11443:2014 and wherein the foam composition is produced with a physically blowing agent; and
wherein the melt strength of the high density polyethylene is ≥10 cN, and
wherein the foam composition comprising high density polyethylene has been obtained by physical foaming high density polyethylene with characteristics
MI in the range between ≥0.01 and ≤0.9,
density in the range between ≥930 and ≤985 kg/m³,
a gel fraction less than 5%,
which has been obtained by chain branching high density polyethylene with characteristics
MI in the range between ≥7 and ≤100, and
density in the range between ≥930 and ≤985 kg/m³,
wherein chain branching is performed by irradiation.

15. The bottle of claim 14, wherein layer B is a foam having more than 90% closed cells.

16. The bottle of claim 14, wherein a ratio between a thickness of the foam layer (B) and a total thickness of the bottle is between 0.4-0.9, and the polymer in layer (A) and layer (C) is each independently a high density polyethylene.

* * * * *